United States Patent
Don et al.

(10) Patent No.: US 6,516,394 B1
(45) Date of Patent: Feb. 4, 2003

(54) SYSTEM AND METHOD FOR MANAGEMENT OF STORAGE DEVICES USING LABELS

(75) Inventors: Arieh Don, Brookline, MA (US); Alexandr Veprinsky, Brookline, MA (US); David C. Butchart, Sammamish, WA (US)

(73) Assignee: EMC Corporation, Hopkinton, MA (US)

(*) Notice: Subject to any disclaimer, the term of this patent is extended or adjusted under 35 U.S.C. 154(b) by 169 days.

(21) Appl. No.: 09/798,580

(22) Filed: Mar. 2, 2001

(51) Int. Cl.[7] .............................................. G06F 12/00
(52) U.S. Cl. .................... 711/162; 711/161; 707/202; 707/204
(58) Field of Search ................ 711/161, 162; 714/6; 707/202, 203, 204

(56) References Cited

U.S. PATENT DOCUMENTS

| | | | | |
|---|---|---|---|---|
| 5,715,462 A | * | 2/1998 | Iwamoto et al. ............ 717/173 |
| 5,978,791 A | * | 11/1999 | Farber et al. ................. 707/2 |
| 6,173,376 B1 | * | 1/2001 | Fowler et al. .............. 711/162 |
| 6,175,904 B1 | * | 1/2001 | Gunderson ................. 711/162 |
| 6,209,002 B1 | * | 3/2001 | Gagne et al. ............... 707/204 |

* cited by examiner

Primary Examiner—Do Hyun Yoo
Assistant Examiner—Nasser Moazzami
(74) Attorney, Agent, or Firm—Robert Kevin Perkins; Leanne J. Fitzgerald; John M. Gunther (57) ABSTRACT

This invention is a data storage system that includes logic configured for carrying out a method to allow a so-called "re-labeling" of a logical volume. Re-labeling changes the label configuration originally put in place by the host at a first device and replicated to a second device. The re-labeling takes place during a certain operation that takes the second device offline to a host computer in communication with the data storage system. This re-labeling avoids labeling conflicts that could arise when duplicate labels result on two different devices as a result of the replication.

12 Claims, 9 Drawing Sheets

SYSTEM AND METHOD FOR MANAGEMENT OF STORAGE DEVICES USING LABELS

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to management of multiple volumes of data distributed throughout a data storage environment, and more particularly to a system and method for management of device labels used by host systems that interact with data storage systems, when such labels are written as data and distributed over more than one device.

BACKGROUND OF THE INVENTION

As is known in the art, computer systems generally include a central processing unit (CPU), a memory subsystem, and a data storage subsystem. According to a network or enterprise model of the computer system, the data storage system associated with or in addition to a local computer system, may include a large number of independent storage devices, typically disks housed in a single enclosure or cabinet. This array of storage devices is typically connected to several computers or host processors over a network or via dedicated cabling. Such a model allows for the centralization of data that is available to many users but creates a critical hub for operations.

Recently, disk redundancy has evolved as an alternative or complement to historical backups of the information stored on this critical hub. Generally speaking, in a redundant system, two storage devices, such as disk storage devices, data is copied and stored in more than one place. This allows the data to be recovered if one storage device becomes disabled. In a basic approach, a first disk storage device stores the data and a second disk storage device stores a point-in-time copy of that data. Whenever a data transfer is made to the first disk storage device, the data is also transferred to the second disk storage device. Typically, separate controllers and paths interconnect the two disk storage devices to the remainder of the computer system.

While mirroring has important advantages, it may lead to problems in certain circumstances when all of data including some that is unique to the physical storage device itself is replicated. In particular some host computers use a proprietary operating system that internally manages data storage devices by using "labels," which are typically host-written character strings or some other technique to internally identify disks. For example hosts operating under the Microsoft Windows NT operating system does not allow duplicate labels. This creates problems when data is replicated from one device to another and the labels are replicated as well. When the label is so replicated to at least one other device, the host can encounter two devices carrying the same identification information and treat that as an error.

What is needed is a way to prevent such errors occurring at a host interacting with a data storage system in which data is distributed over one or more disks but while still allowing mirror copying of data to occur.

SUMMARY OF THE INVENTION

The present invention is a system and method for management of device identification that is treated as device data, when such data is replicated from one storage device to at least one other storage device.

In one aspect of the invention, the data storage system is configured with logic that enables a method of changing a host-written label, denoted as "re-labeling" for a logical volume. Such a logical volume in a preferred embodiment may be one created for continuing business operations while other activities occur that use a copy of the data on the logical volume, wherein such logical volumes may be denoted as a "business continuance volume (BCV)."

Re-labeling changes the label originally written by the host on one device and replicated to another device, which received a point-in-time copy of the first device's data. The re-labeling takes place during a certain operation that takes the BCV offline to a host computer in communication with the data storage system. In the preferred embodiment, the operation that takes the BCV offline is referred to as a "split with re-label" operation. This re-labeling avoids labeling errors that could arise when duplicate labels result from at least one of the following situations: (i) following a split operation, wherein the BCV has a copy, i.e., an exact replica, of the data from a standard device which has been copied to the BCV; including the identifying label, or (ii) following an operation to "restore" the standard device from a device (such as a BCV) having a copy of data originally copied from the standard device. This invention is also useful when a single host encounters two volumes, each distributed, respectively, over a local and remote system.

BRIEF DESCRIPTION OF THE DRAWINGS

The above and further advantages of the present invention may be better under stood by referring to the following description taken into conjunction with the accompanying drawings in which.

DETAILED DESCRIPTION OF THE PREFERRED EMBODIMENT

The methods and apparatus of the present invention are intended for use in data storage systems, such as the Symmetrix Integrated Cache Disk Array system available from EMC Corporation of Hopkinton, Mass. Specifically, this invention is directed to methods and apparatus for use in systems of this type that include transferring a copy set of data from a standard device to a redundant device for use in applications such as backup or error recovery, but which is not limited to such applications. The present invention addresses a problem that results when data is replicated from such a standard device and includes identification information, such as a label, for the standard device that may create an error at the host which encounters two different devices carrying identical labels.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission. And may be implemented such that herein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

The logic for carrying out the method is embodied as part of the system described below beginning with reference to FIGS. 1 and 2, and which is useful for solving a particular problem created in the environments described with reference to FIGS. 3–8. One aspect of the invention is embodied as a method that is described below with reference to FIGS. 9–13. For purposes of illustrating the present invention, the invention is described as embodied in a specific configuration, but one skilled in the art will appreciate that the device is not limited to the specific configuration but rather only by the claims included with this specification.

Data Storage Environment Including Logic for this Invention

Figure 1:
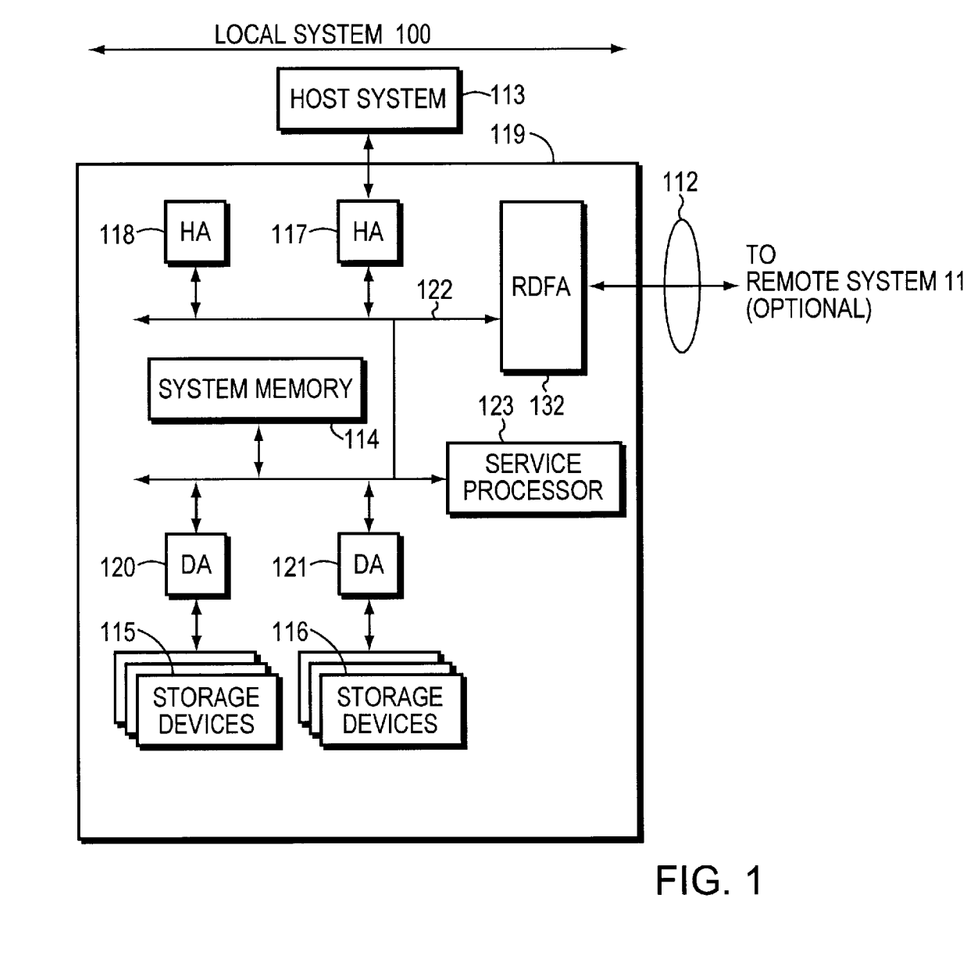
FIG. 1 is a block diagram of a computer system including logic for operating the present invention and showing communicating local and remote data storage environments.

Referring now to FIG. 1, reference is now made to a computer system environment in which the invention is particularly usefull and includes a local system 100 (also referred to as "source" or "primary" system) which may be in communication across link 112 with an essentially identical remote system 111, also referred to as "target" or "secondary" system (not shown). For purposes of this invention it is sufficient to understand that the remote system 111 normally acts as a mirror of the local system 100 on a volume-by-volume basis and that the volumes can by physical volumes, although logical volumes are preferred. This invention is usefull when a single host encounters two volumes, each distributed respectively over a local and remote system.

Local system 100 includes a data storage system 119 that in a preferred embodiment is a Symmetrix Integrated Cache Disk Arrays system available from EMC Corporation of Hopkinton, Mass. Such data storage systems and their implementations are fully described in U.S. Pat. No. 6,101, 497 issued Aug. 8, 2000, and also in U.S. Pat. 5,206,939 issued Apr. 27, 1993, each of which is assigned to EMC the assignee of this invention and each of which is hereby incorporated by reference. Consequently, the following discussion makes only general references to the operation of such systems.

The invention is useful in a local system itself wherein data is replicated to a local volume for allowing continued business operations, such as during backup. Such a volume in a preferred embodiment is denoted as a business continuance volume (BCV), which are described with reference to FIG. 2 herein. A system employing BCV's is fully described in the incorporated '497 patent.

The local system 100 comprises major components including a host system 113 formed of a host processor and the data storage facility 119 that includes a system memory 114 and sets or pluralities 115 and 116 of multiple data storage devices or data stores. The system memory 114 can comprise a buffer or cache memory; the storage devices in the pluralities 115 and 116 can comprise disk storage devices, optical storage devices and the like. The sets 115 and 116 represent an array of storage devices that may be arranged in a variety of known configurations. However, in a preferred embodiment the storage devices are disk storage devices.

Host adapters (HA) 117–118 provide communications between the host system 113 and the system memory 114; device or disk adapters (DA) 120 and 121 provide pathways between the system memory 114 and the storage device pluralities 115 and 116. A bus 122 interconnects the system memory 114, the host adapters 117 and 118 and the disk adapters 120 and 121. Remote Data Facility Adapter (RDFA) 132 provides access to along path 112 to a remote system (not shown).

System memory 114 is used by various elements within the respective systems to transfer information and interact between the respective host adapters and disk adapters. Additionally, a service processor 123 monitors and controls certain operations and provides a primary interface for an external operator to respective systems and may be used for implementing utilities such as a utility for carrying out operations of the present invention.

Logic for carrying out the methods of this invention are preferably included as part of the data storage system 119, and may be implemented in whole or part with the host and/or disk adapters, or as part of the service processor, or may in whole or part be included in computer readable form on either host system. Nevertheless, one skilled in the computer arts will recognize that the logic, which may be implemented interchangeably as hardware or software may be implemented in various fashions in accordance with the teachings presented now.

Generally speaking, the local system 100 operates in response to commands from one or more host systems, such as the host system 113, that a connected host adapter, such as host adapter 117 receives. In a preferred embodiment for implementation of this invention, host system 113 is a host running a Windows NT-or similar operating system, or any computer which uses a labeling scheme for managing storage devices for which the present invention is useful.

The host adapters 117 and 118 transfer commands to a command buffer that is part of system memory 114. The command buffer stores data structures and write requests that the host adapters generate. The disk adapters, such as the disk adapters 120 or 121, respond by effecting a corresponding operation using the information in a command buffer. The selected disk adapter then initiates a data operation. Reading operations transfer data from the storage devices to the system memory 114 through a corresponding disk adapter and subsequently transfer data from the system memory 114 to the corresponding host adapter, such as host adapter 117 when the host system 113 initiates the data writing operation.

Figure 2:
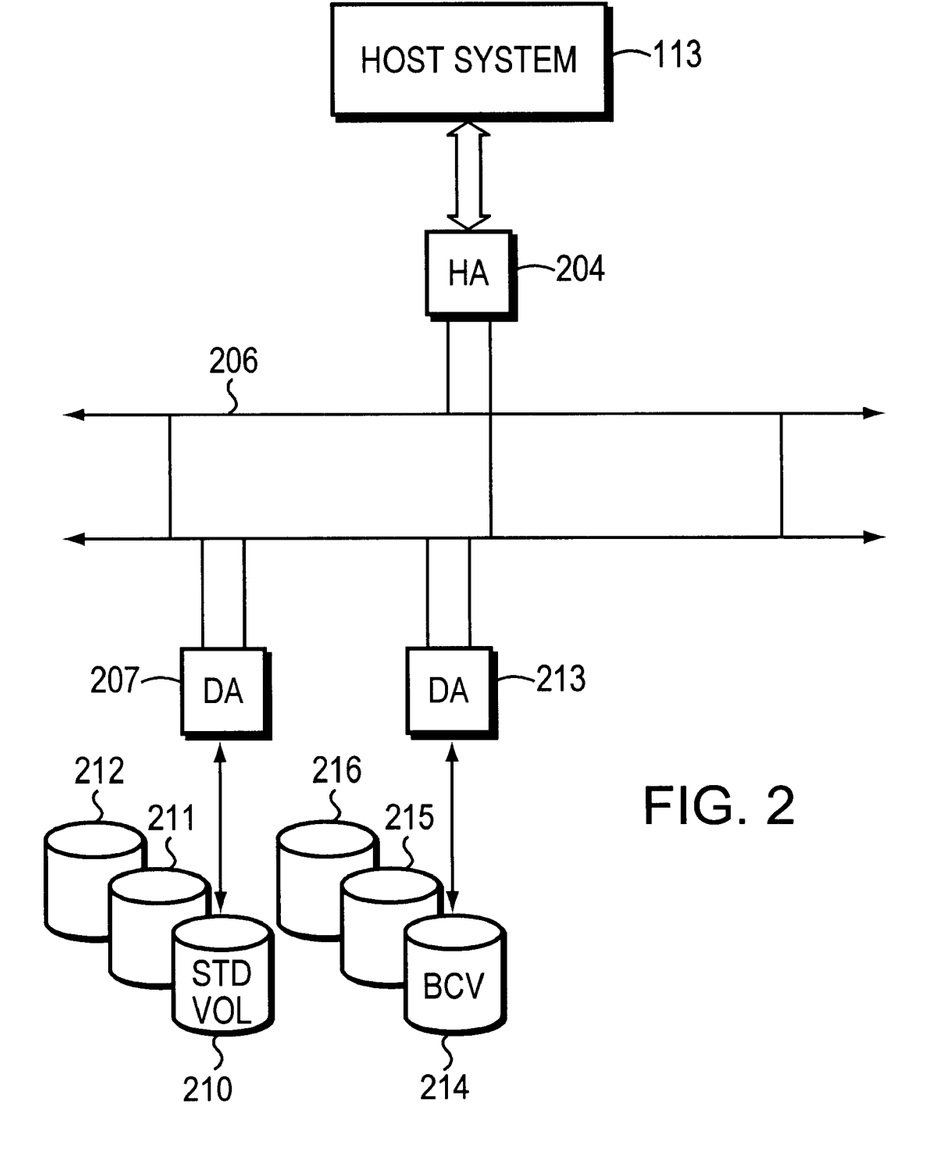
FIG. 2 is an alternative embodiment of the local data storage environment and the computer system of FIG. 1 and which shows at least one logical standard and a device to which its data can be copied and which is denoted as a business continuance volume (BCV) in a preferred embodiment for which the present invention is useful.

FIG. 2 represents a particular preferred configuration of local system 100 shown in FIG. 1 that includes host system 113 which communicates through a corresponding host adapter 204. A bus system 206 interconnects the host adapter 204 with disk adapters 207 and 213 that are like the disk adapters 120 and 121 in FIG. 1. In this particular embodiment, the disk adapter 207 controls the operations of a series of physical disks that are shown in terms of three logical volumes 210, 211, and 212. The segmentation or hypering of physical disks into logical volumes is well known in the art.

Similarly a disk adapter 213 interfaces another series of logical volumes 214, 215 and 216 to the bus 206. Each of these volumes 214 through 216 is defined as a Business Continuation Volume and is designated a BCV device. The concept of BCV's are described in detail in the incorporated '497 patent so will be only generally described herein. Each BCV device comprises a standard disk controller and related disk storage devices as shown in FIG. 1 especially configured to independently support applications and processes. The use of these BCV devices enables a host such as host 113 to utilize instantaneous copies of the data in the standard volumes 210 through 211. There typically will be at least one BCV volume assigned to each host device that will operate on a data set concurrently.

Referring again to FIG. 2, host 113 may continue online transaction processing or like processing without any impact or load on the volumes 210 through 212, while their respective point-in-time copies on BCV's 214–216 are used to back up data. All of this is essentially transparent to the user, but as will become apparent a problem that is created in such an environment is resolved by this invention.

The operation of a BCV device and its corresponding BCV volume or volumes is more readily understood in terms of data sets stored in logical volumes and is useful for understanding the present invention. As known, any given logical volume may be stored on a portion or all of one physical disk drive or on two or more disk drives.

Examples of configurations in which the invention is useful are described below with reference to FIGS. 3–8. Some known configurations and commands are described with reference to this figures for purposes of explaining problems that would exist in such data storage system environments without the present invention.

Figure 3:
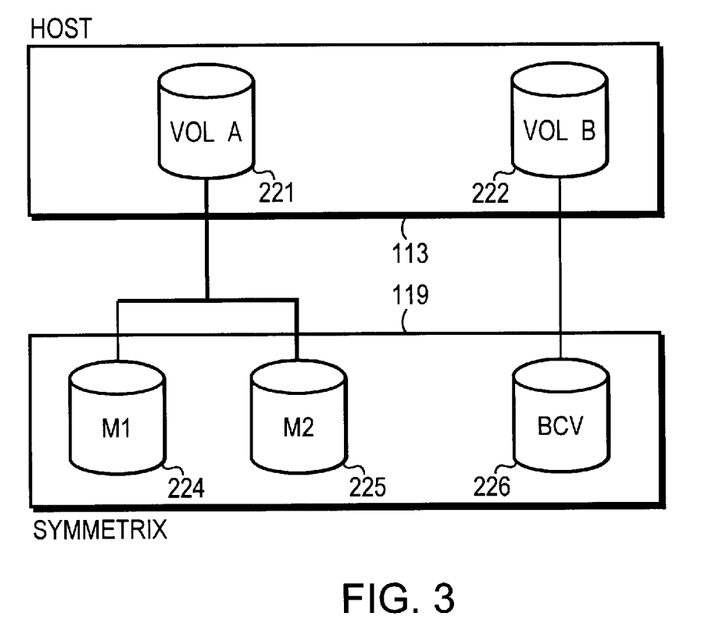
FIG. 3 is a representation of a configuration of the computer system of FIG. 2 in which the invention may be configured and operate with standard and BCV devices.

FIG. 3 depicts host 113 (FIG. 2) containing two types of applications. In the context of a set of application programs, a Volume A application 221 could represent an application that operates on a data set in a logical Volume A and a Volume B application 222 could represent a backup application. Also in FIG. 3, a storage unit 119 (preferably an EMC Symmetrix) is represented as comprising two physical disk volumes that are a mirror pair, denoted as M1 and M2 respectively. They are an M1 volume 224 and an M2 volume 225. These volumes are constructed similar to the volumes 210–212 discussed earlier with reference to FIG. 2.

Following this example configuration, a third storage volume 226 comprises a BCV device 226. This BCV device is similar in construction to the BCV devices 214–216 discussed earlier with reference to FIG. 2. In this particular example, the M1 and M2 devices 224 and 225 comprise multiple physical disks as might be incorporated in a RAID-5 redundancy. In such an event the BCV volume would also comprise multiple disks so that the BCV device could act as a mirror. Generally each mirror volume and the BCV device will be on physical disk drives that connect to separate disk adapters, as known in the art.

Figure 4:
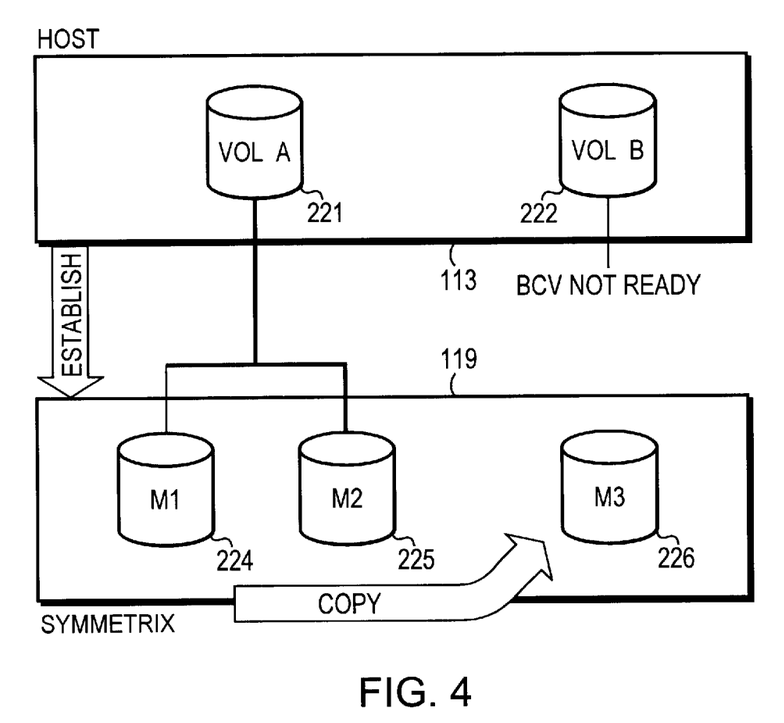
FIG. 4 is a representation of the configuration shown in FIG. 3 and demonstrating the effect of the ESTABLISH command on such a configuration.
Figure 5:
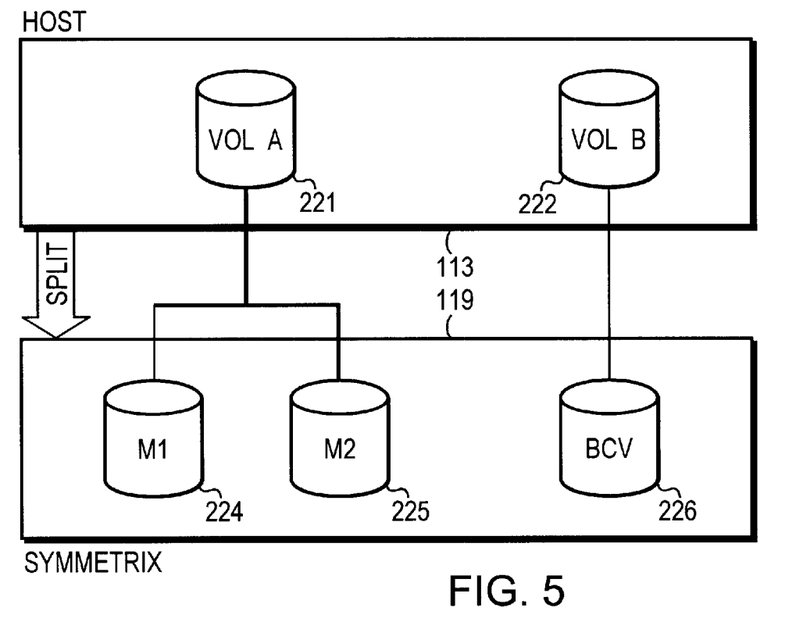
FIG. 5 is a representation of the configuration shown in each of FIGS. 3 and 4 demonstrating the effect of the SPLIT command on such a configuration.
Figure 6:
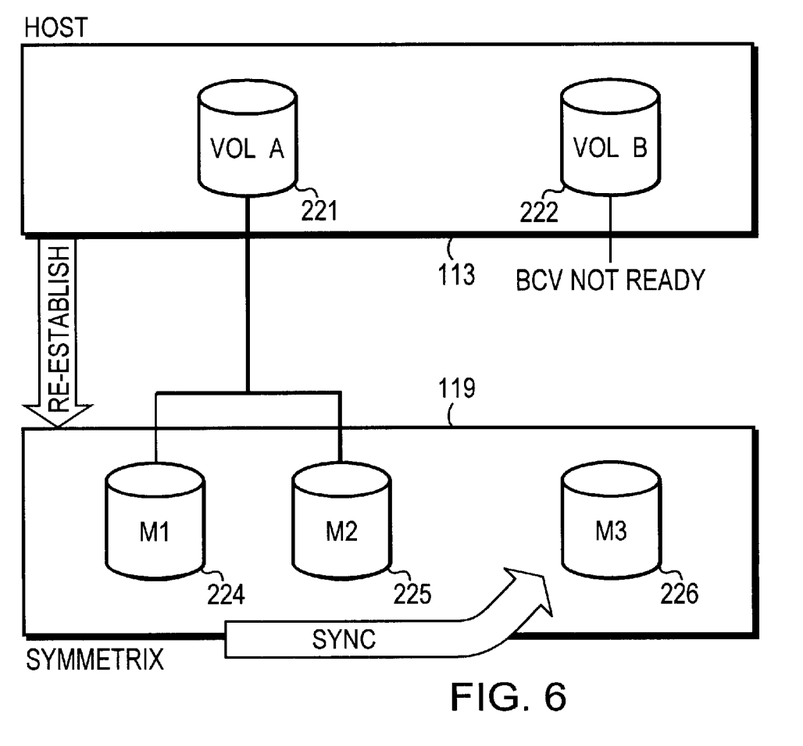
FIG. 6 is a representation of the configuration shown in each of FIGS. 3–5 and demonstrating the effect of the RE-ESTABLISH command on such a configuration.

Once the shown relationship is established, the host 113 in FIG. 4 can issue a number of commands to ESTABLISH the BCV device 226 as another mirror, to SPLIT the BCV device 226 as a mirror and re-establish a data transfer path with the volume 222, (FIG. 5) to RE-ESTABLISH the BCV device as a mirror 226 and to restore data from the BCV device 226 when it operates as a mirror synchronized to the storage devices 224 and 225 (FIG. 6). Each of these operations is described in detail in the incorporated '497 reference, but are briefly explained now for the sake of completeness.

Reference is made now to FIGS. 4, and 5 for explaining the ESTABLISH and SPLIT commands. In the example configuration of FIG. 4, the ESTABLISH command pairs BCV device 226 to standard device 224 M1 as the next available mirror M3. Then all tracks (full volume) are copied from the standard device M1 to the BCV device. Referring now to FIG. 5, on issuance of the SPLIT command following the ESTABLISH command, the established standard/BCV pair (224/226) are broken apart and the BCV 224 becomes available to its original host address.

In FIG. 6, a RE-ESTABLISH command is issued by Host 113 to resynchronize the previously SPLIT standard/BCV pair by performing effectively an incremental ESTABLISH. Under operation of this command only updated tracks from the standard to the BCV device are copied and any BCV tracks that were changed are refreshed. The BCV device is not available to its original host address until SPLIT again. In a normal environment, once the volumes are ESTABLISHED, normal operation consists of a series of sequential RE-ESTABLISH and SPLIT commands according to some predetermined schedule, which is often dictated by backup needs.

Figure 7:
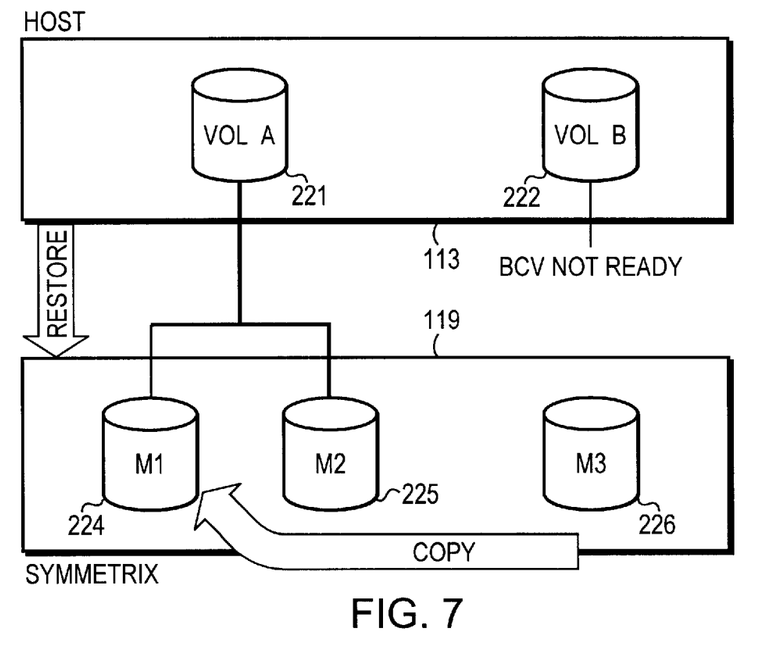
FIG. 7 is a representation of the configuration shown in FIG. 3 and demonstrating the effect of the RESTORE command on such a configuration.
Figure 8:
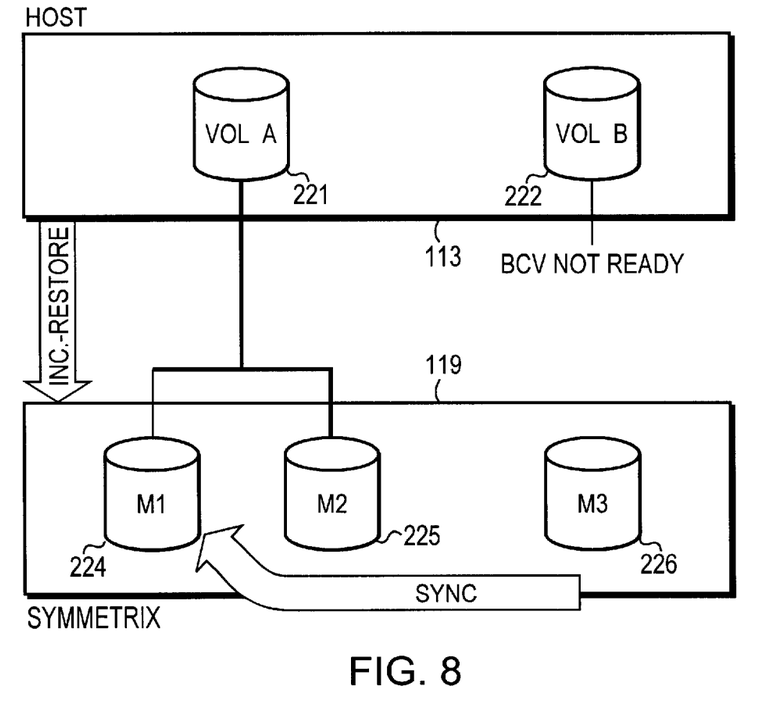
FIG. 8 is a representation of the configuration shown in FIGS. 3 and 7 and demonstrating the effect of the INCREMENTAL RESTORE command on such a configuration.

Referring to FIGS. 7 and 8, Analogous commands to ESTABLISH and RE-ESTABLISH are RESTORE and INCREMENTAL RESTORE. For example, with reference to FIG. 7, on issuance of a RESTORE command, BCV device 224 is paired to standard device 226 as the next available mirror. Then all volumes are copied (full volume) from the BCV 224 to the standard device 226. Thus, copying under the RESTORE command occurs in the reverse direction from the ESTABLISH command. The BCV is made not available to its original Host address. Shown in FIG. 8, the INCREMENTAL RESTORE is the same as the restore except copies are made only of updated tracks from BCV to the Standard device and the devices are resynchronized. A SPLIT command (FIG. 5) may be issued to make the BCV device once again available to the Host 113 after either the RESTORE or INCREMENTAL RESTORE.

Typically, the RESTORE and INCREMENTAL RESTORE commands are used in circumstances requiring recovery of data, perhaps due to an error or fault. Either command allows essentially returning the state of the data from the standard device back to a condition it had been at about when an ESTABLISH or RE-ESTABLISH command was issued.

Generally, the inventors have critically recognized that each of the above-described mirroring situations has the potential of propagating an error condition. In general terms, the problem solved by this invention relates to identical host-written data storage device identification information (labels) being present to at least two different devices as a result of data replication. This condition may result in an error condition at a host that encounters the identical labels on the different devices. Without this invention, such problems are likely to occur using at least the ESTABLISH or RESTORE command (FIGS. 4 and 7), or any command which copies all tracks full volume from a standard to a BCV device or vice-versa.

Example of Problem Solved by this Invention in the Preferred Environment:

In the preferred environment for implementing the present invention, the host 113 is capable of running a Windows NT-or similar operating system, or it is any computer which uses a labeling scheme for managing storage devices. Preferably, the data storage system 119 is an EMC Symmetrix Integrated Cache Disk Array. In such an environment, it is known that host 113 may use host-written character strings or labels to internally identify disks. The inventors have critically recognized that such a configured host 113 operating under the Microsoft Windows NT or similar operating system would not allow duplicate labels. The inventors have also recognized that this will create problems when data is replicated from one device to another and the labels are replicated as well. When the label is so replicated to at least one other device the host can encounter two devices carrying the same identification information and treat that as an error.

Solution Provided by this Invention

To solve this problem, the systems of FIGS. 1 and 2 are configured and programmed to implement a novel method discussed in detail below, following a brief overview.

Overview of Re-labeling Function

The data storage system includes logic configured for enabling a method to allow a so-called "re-labeling" of any logical volume, which in a preferred embodiment is a (BCV). Re-labeling changes the label originally written by the host at one device and replicated to another device that received a full volume copy of the first device's data. The re-labeling takes place during a certain operation that takes the BCV offline to a host computer in communication with the data storage system. In the preferred embodiment, the operation that takes the BCV offline is referred to as a "split with re-label" operation. This re-labeling avoids labeling conflicts that could arise when duplicate labels result from at least one of the following situations: (i) following a split operation, wherein the BCV becomes a mirror copy, i.e., an exact replica, of a standard device which has been copied to the BCV; including the identifying label, or (ii) following an operation to "restore" the standard device from its mirror copy stored on the BCV such that the standard device becomes a mirror copy of the BCV device, including the label.

Method of the Invention

Figure 9:
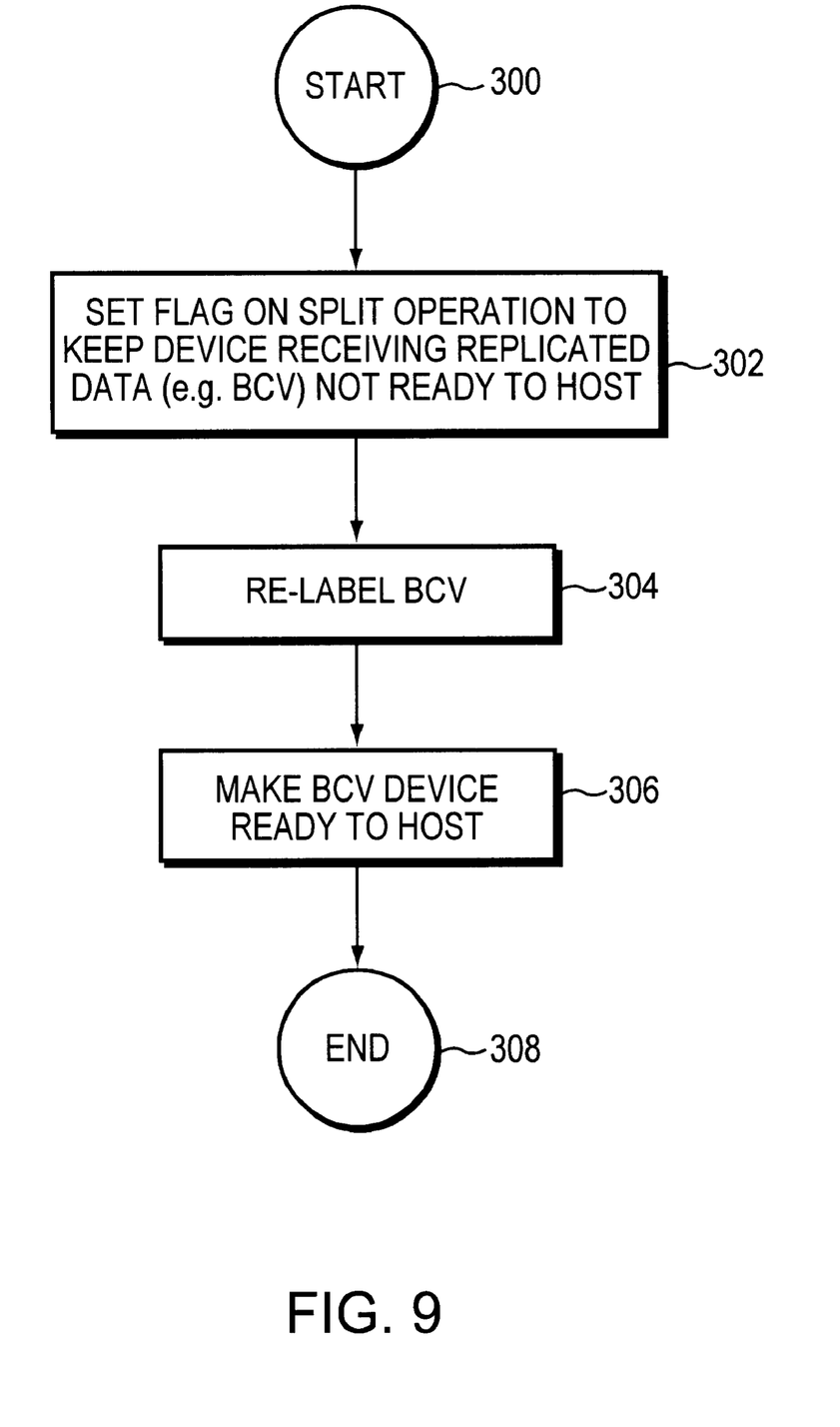
FIG. 9 is a flow logic diagram illustrating an overview of the steps of the method of this invention carried out by the logic of this invention.

Now for a better understanding of the method steps of this invention the steps are described in detail with reference to FIGS. 9–12. FIG. 9 shows an overview of the steps starting at step 300. In step 302, during a SPLIT WITH RELABEL operation, similar to the SPLIT operation described with reference to FIG. 5 but having some difference. Specifically, this new operation also requires that a flag be set to keep a device having replicated data, such as a BCV, not available to its original host address (referred to as "NOT READY to the host" in the preferred embodiment) until the re-labeling function is complete. The re-labeling function generally takes place in step 304, and then in step 306 the BCV device is once again made available or READY to the host, as is typically done to complete a SPLIT operation (FIG. 5). Processing for the method steps ends in step 308.

Figure 10:
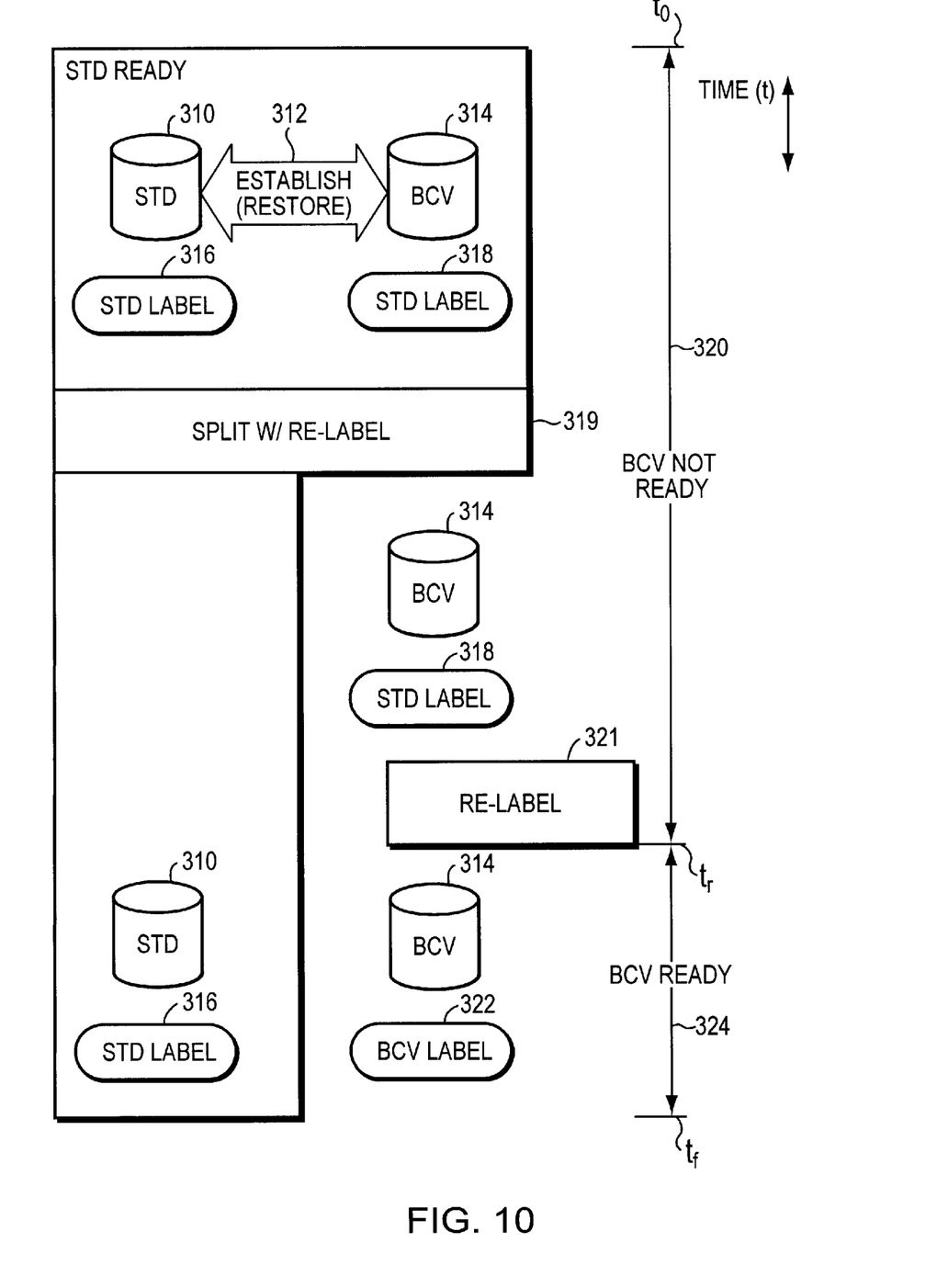
FIG. 10 is a schematic representation of configuration changes which occur to data sets stored on the system of FIG. 1 in accordance with the operation of the method steps overviewed in FIG. 9.

FIG. 10 provides a graphic or schematic overview of the effect on the configuration shown in FIGS. 1 and 2 under the effect of the re-labeling method, illustrated over a time period arbitrarily designated as $t_0$ to $t_f$. During the time period beginning at $t_0$ and ending at $t_r$ illustrated over time delimiter line 320 the BCV is held NOT READY. The standard device 310 is held READY to the Host 113 (FIGS. 1 and 2) during the entire time period $t_0$ to $t_f$. Arrow 312 represents the ESTABLISH command (FIG. 4) which sets up a copy on the BCV device 314. When this happens the standard label 316 written by the host when originally configuring the storage device is copied as standard label 318 onto the BCV. Thus, without the re-labeling method the host may have two or more different devices having the same or label which will be flagged as an error by a host encountering those different devices with the identical label.

One skilled in the art will recognize that the re-labeling would also be effective for resolving such problems created after a RESTORE command (FIG. 7). One skilled in the art will further recognize that the invention is useful in any environment in which storage device identification information is replicated from one device to at least one other device, including remote configurations.

Referring again to FIG. 10, following the ESTABLISH command replicating the label, a SPLIT WITH RE-LABEL command represented by block 319 starts and the flag is set to hold the BCV in a NOT READY state (see FIG. 9) until time $t_r$. As illustrated in this time sequence, the BCV device 314 still carries the standard label 318 up until the change label or RE-LABEL function represented by block 321 occurs and ends at time $t_r$. During the RE-LABEL function the standard label 318 is changed to a new BCV label 322, and following that occurrence (after time $t_r$) the SPLIT WITH RELABEL operation is allowed to complete and the BCV device 314 is made READY to the host and occurring over the time delimiter line 324 ($t_r$ to $t_f$). Now the standard device 310 has its label 316 which is now different from the BCV label 322 and therefore no error will occur at the host. This process is complete at time $t_f$.

Figure 11:
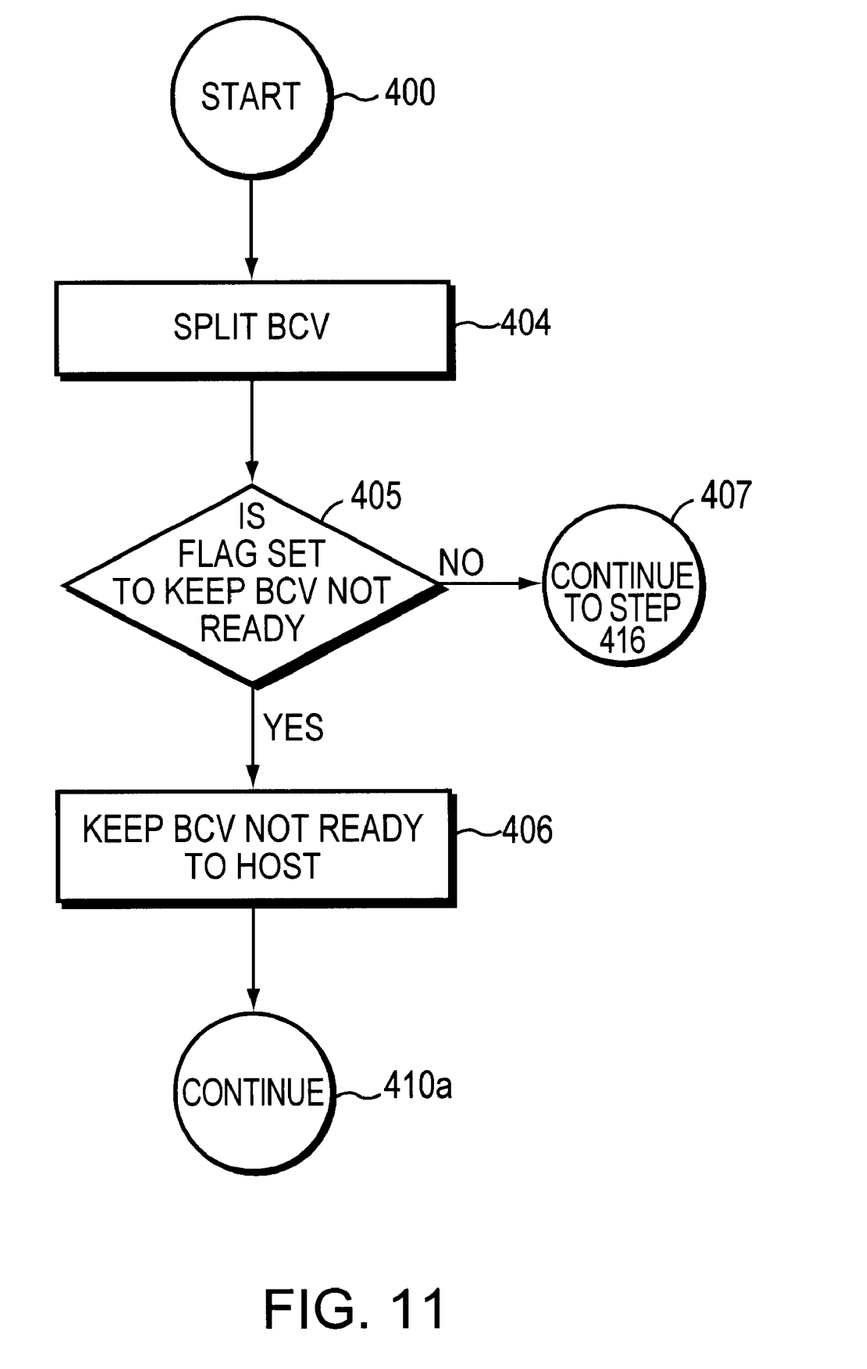
FIG. 11 is another flow logic diagram illustrating detailed steps of the method of this invention overviewed in FIG. 9 and carried out by the logic of this invention.
Figure 12:
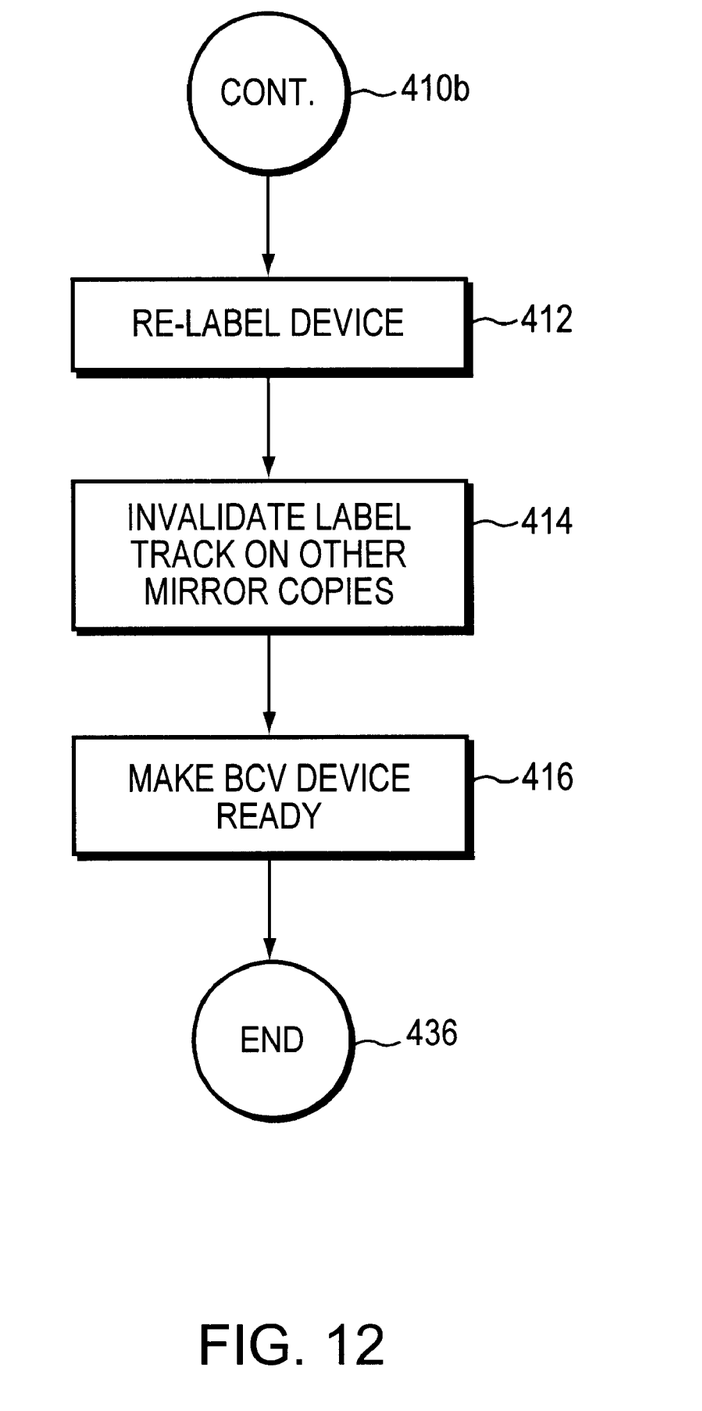
FIG. 12 is another flow logic diagram illustrating more steps of the method of this invention overviewed in FIG. 9 and carried out by the logic of this invention.

Reference is now made to FIGS. 11–13 that illustrate more specific details of the method steps carried out as part of the method that has been illustrated in overview form in FIG. 9 with further graphic illustration in FIG. 10. In FIG. 11, processing begins at step 400. A BCV is SPLIT from the Host in step 404. An inquiry is posed in step 405 to determine if a flag has been set to keep the BCV in a NOT READY state. If the answer is no, then step 407 directs that processing continues to step 416 (FIG. 12). Otherwise, the BCV is kept READY in step 406. Processing continues from step 410a to 410b (FIG. 12).

Referring to FIG. 12, the host-written label is changed in step 412 so that the BCV device no longer carries the matching label to the standard device and thus an error may be avoided. In step 414, the label track on all other mirrored copies is invalidated. The BCV device is made READY to the host in step 416. Finally the process ends in step 436 when all BCV's have been processed.

A system and method has been described for resolving potential conflicts among one or more storage devices in an environment in which a host manages storage devices by creating its own label for each device and in which data from such devices is replicated across one or more other devices. Having described a preferred embodiment of the present invention, it may occur to those skilled in the relevant art to incorporate these concepts into other embodiments. Nevertheless, this invention should not be limited to the disclosed embodiment, but rather only by the spirit and scope of the following claims and their equivalents.

What is claimed is:

1. In a computer system having a plurality of storage devices and a host computer which interacts with the plurality of storage devices and which labels at least one storage device of the plurality of storage devices, a method for managing such labels when data is replicated from a storage device of the plurality of storage devices to another storage device of the plurality of storage devices, the method comprising the steps of:

replicating data from a first storage device to a second storage device, wherein a host-written label from the first storage device is replicated to the second storage device;

making the second storage device unavailable to the host; and changing the host-written label replicated to the second storage device, wherein the changed label is readable by the host.

2. The method of claim 1, wherein the second storage device is made available to the host, following the step of changing the host-written label.

3. The method of claim 2, wherein the first and second storage devices are each disk drives.

4. The method of claim 3, wherein the host operates under a Microsoft NT operating system.

5. The method of claim 1, wherein the plurality of storage device are distributed such that the second storage device is remotely located from the first storage device.

6. The method of claim 1, wherein the replication is the result of a restore operation.

7. A data storage system that communicates with a host computer and which has computer-executable logic for managing identification of the storage devices for the host computer when data is replicated over more than one physical device, the data storage system comprising:

a plurality of storage devices including at least a first storage device and a second storage device, wherein the second storage device is configured to be able to receive data copied from the first storage device; and computer-executable logic configured for causing the following computer-executed steps to occur:

replicating data from a first storage device to a second storage device, wherein a host-written label from the first storage device is replicated to the second device;

making the second storage device unavailable to the host; and changing the host-written label replicated to the second storage device, wherein the changed label is readable by the host.

8. The data storage system of claim 7, wherein the second storage device is made available to the host, following the step of changing the host-written label.

9. The data storage system of claim 8, wherein the first and second storage devices are each disk drives.

10. The data storage system of claim 9, wherein the host operates under a Microsoft NT operating system.

11. The data storage system of method of claim 7, wherein the plurality of storage device are distributed such that the second storage device is remotely located from the first storage device.

12. A program product for use in a data storage system that communicates with a host computer and that is for managing identification of the storage devices for the host computer when data is replicated over more than one physical device of the plurality of storage devices that is part of the data storage system, the program product comprising:

computer-executable logic contained on a computer-readable medium and which is configured for causing the following computer-executed steps to occur:

replicating data from a first storage device to a second storage device, wherein a host-written label from the first storage device is replicated to the second device;

making the second storage device unavailable to the host; and changing the host-written label replicated to the second storage device, wherein the changed label is readable by the host.

* * * * *